United States Patent [19]
Munroe

[11] Patent Number: 5,418,960
[45] Date of Patent: May 23, 1995

[54] TRANSPARENTLY SELF-CONFIGURED OPTION BOARD USING AN OPTION BOARD PROTOCOL PROM

[75] Inventor: R. Bruce Munroe, Milton, Mass.

[73] Assignee: Sun Microsystems, Inc., Mountain View, Calif.

[21] Appl. No.: 821

[22] Filed: Jan. 5, 1993

Related U.S. Application Data

[63] Continuation of Ser. No. 545,850, Jun. 29, 1990, abandoned.

[51] Int. Cl.⁶ .................................................. G06F 9/04
[52] U.S. Cl. .................................... 395/700; 395/200; 364/280.2; 364/DIG. 1
[58] Field of Search ................ 364/200, 900; 395/275, 395/700

[56] References Cited

U.S. PATENT DOCUMENTS

| | | | |
|---|---|---|---|
| 4,701,848 | 10/1987 | Cyde | 364/300 |
| 4,908,792 | 3/1990 | Przybyla et al. | 364/900 |
| 5,003,466 | 3/1991 | Schan, Jr. et al. | 364/200 |
| 5,083,259 | 1/1992 | Maresh | 395/325 |

FOREIGN PATENT DOCUMENTS 2203869 10/1988 United Kingdom.

OTHER PUBLICATIONS

*Commodore 64 Programmer's Reference Guide*, Howard W. Sams & Co., Inc. pp. 268-273, 284, 285, 291.

*Primary Examiner*—Crhistopher B. Shin
*Attorney, Agent, or Firm*—Blakely Sokoloff Taylor & Zafman

[57] ABSTRACT

The present invention is an option board protocol (OBP) PROM for interfacing an optional peripheral device or board with a host computer system without retrofitting the CPU PROM. In general, the CPU PROM does not recognize option boards unless they are known to the designer of the CPU PROM and properly controlled by built-in drivers of the CPU PROM as accessed through a ROMVEC Table of the CPU PROM. The OBP PROM allows the option board to participate in the Power On sequence just as other standard peripheral devices. During a POST sequence, the CPU activates the OBP code, installs the diagnostics, and then the OBP PROM tests the option board itself, using tools provided by the CPU PROM. The OBP PROM may load its own driver before completing the POST sequence. The OBP support code in the CPU PROM provides three new functions to reduce the duplication of code, to standardize the testing methods and to streamline the diagnostic functions of the POST sequence.

20 Claims, 9 Drawing Sheets

| CPU Address | Offset (Mode 0) | Offset (Mode 1) | Description | Width (bits) | |
|---|---|---|---|---|---|
| F6000000 | 0 | 0 | Device ID (8 bits) | 8 | 108 |
| F6000004 | 1 | 4 | Revision Number | 8 | 110 |
| F6000008 | 2 | 8 | PROM size (in kbytes) (max = 64) | 16 | 112 |
| F6000010 | 4 | 10 | PROM address for O/S code/drivers | 32 | 118 |
| F6000020 | 8 | 20 | Length of O/S code/drivers section | 32 | |
| F6000030 | C | 30 | PROM address for Diagnostic code | 32 | 120 |
| F6000040 | 10 | 40 | Length of Diagnostic code section | 32 | |
| F6000050 | 14 | 50 | Run Mode: (0 = LOAD into RAM, 1 = Executable) | 8 | 114 |
| F6000054 | 15 | 54 | Board Type: (1 - VIDEO, 2 = RAM, 3 = BOOT DEV) | 8 | 122 |
| F6000058 | 16 | 58 | ID Word | 16 | 124 |
| F6000060 | 18 - 1E | 60 - 78 | Reserved | - | |
| F600007C | 1F | 7C | Checksum | 8 | 126 |
| F6000080 | 20 | 80 | Start of OBP code | to end | 128 |

*Figure 5*

TRANSPARENTLY SELF-CONFIGURED OPTION BOARD USING AN OPTION BOARD PROTOCOL PROM

This is a file wrapper continuation application of U.S. patent application Ser. No. 07/545,850, filed on Jun. 29, 1990, entitled A Transparently Self-Configured Option Board Using an Option Board Protocol PROM, now abandoned.

BACKGROUND OF THE INVENTION

1. Field of the Invention

The present invention relates to the field of interfacing peripheral devices with a host computer system. In particular, this invention installs and/or upgrades an optional peripheral device on a host computer system automatically without retrofitting the built-in firmware on the host computer.

2. Art Background

In the past, designers and manufacturers of multiple board computer systems and option boards required mutual knowledge of the existence and capabilities of these option boards so that the host computer's central processing unit (CPU) programmable read only memory (PROM) could recognize and install the option boards properly. Option boards refer generally to user-installable or plug-in peripheral devices which enhance the capabilities of or add new functionality to the host computer. The host computer's CPU PROM initializes and tests the computer system when it is turned on. Some examples of popular option boards are accelerated or high resolution video boards, modems and other communication devices.

The introduction of new option boards after the release of a CPU PROM requires the designers to modify the CPU PROM whenever users wish to install an option board on a host computer system. Sometimes, the cost of retrofitting the original CPU PROM outweighs the benefits of adding a new option board. The cost of retrofitting CPU PROMS is even higher for third-party designers or manufacturers who sell their own versions of option boards. In these cases, third-party option board designers are either forced to purchase a license to use the source code for the CPU PROM or to create option boards that emulate a familiar board on the host computer. Upgrades of the original CPU PROM from the host company reduce the attractiveness of the licensing option, while software compatibility problems and the inability to improve or add to a design often plague the emulating option.

Interfacing an option board to a host computer is further complicated by the fact that the option board may play a role in the Power On sequence of the host computer. Thus, the CPU PROM generally needs to integrate the option board into the Power On sequence. When power is first applied to a computer system, the CPU PROM performs a sequence of operations known as Power On Self Test (POST) which initializes and verifies the integrity of essential hardware components necessary for the computer to operate correctly. During a normal POST sequence, the CPU resets and initializes the registers, probes the computer system to determine the type of peripheral devices installed, reports hardware failures, installs software drivers necessary to interact with the peripheral devices, and finally loads the primary operating system software (i.e. boots the system if no serious hardware failure is diagnosed).

For the remaining portion of the description below, Power On sequence will be used interchangeably with POST.

In general, the CPU PROM does not recognize peripheral devices unless they are previously available and known by the designer of the CPU PROM and are thus properly identified by the CPU PROM. Software drivers resident in the CPU PROM control these peripheral devices and allow the host computer and its users to access and exploit the functionality of the peripheral devices. Many host computers also allow operating system software to access these CPU PROM based drivers via a Vector Table (ROMVEC Table) which is maintained by the CPU PROM. The ROMVEC Table establishes software pointers to various driver routines in the CPU PROM which can then be accessed and used by the operating system software. Thus, much of the low level code and the responsibility for interfacing correctly with the peripheral devices are left in the CPU PROM and shared by all other booted software—simplifying the task of writing software for the operating system and application programs.

SUMMARY OF THE INVENTION

It is therefore an object of the present invention to change the way the central processor unit (CPU) programmable read only memory (PROM) searches for and interlaces with optional peripheral devices through a one-time modification of the CPU PROM and a one-time installation of an Option Board Protocol (OBP) PROM on each peripheral device.

It is a further object of the present invention to achieve the automatic recognition by the CPU PROM of any option board installed on the host computer.

It is another object of the present invention to have the option board take part in the power on self test (POST) sequence by allowing the CPU PROM to activate the OBP PROM, to install its own self-test code, to test itself, and to install its own software drivers for communicating between the option board and the host computer.

It is another object of the present invention to create in the CPU ROMVEC Table support routines for conforming the OBP transparently to the diagnostic standards of the host computer during the POST sequence.

It is another object of the present invention to self-install the software drivers of the OBP PROM for transparent use by the host computer. The OBP PROM software drivers modify the ROMVEC Table entries to replace old pointers with pointers to new driver routines. Thus, through the normal use of the ROMVEC Table routines, the operating system is actually using the new option board. The built-in drivers of the CPU PROM are circumvented without being destroyed in case the option board is ever removed.

The present invention is an option board protocol (OBP) PROM for interfacing an optional peripheral devices or board with a host computer without retrofitting the CPU PROM. In general, the CPU PROM does not recognize option boards unless they are known to the designer of the CPU PROM and properly controlled by built-in drivers of the CPU PROM as accessed through a ROMVEC Table of the CPU PROM. The OBP PROM allows the option board to participate in the Power On sequence just as other standard peripheral devices. During a POST sequence, the CPU activates the OBP code, installs the diagnostics, and then the OBP PROM tests the option board itself, using tools provided by the CPU PROM. The OBP PROM may load its own driver before completing the POST sequence. The OBP support code in the CPU PROM provides three new functions to reduce the duplication of code, to standardize the testing methods and to streamline the diagnostic functions of the POST sequence.

BRIEF DESCRIPTION OF THE DRAWINGS

FIG. 5 illustrates the structure and contents of the OBP PROM header used in the preferred embodiment of the present invention.

NOTATION AND NOMENCLATURE

Figure 1A:
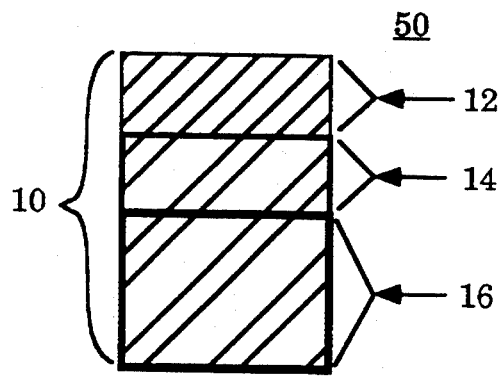
FIG. 1 is a description of the various devices (i.e. memory locations) referenced during a typical Power On Sequence of the preferred embodiment of the present invention.
Figure 1B:
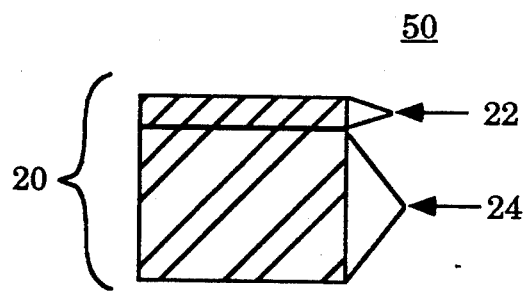
Figure 1C:
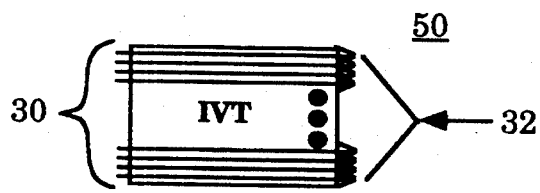
Figure 1D:
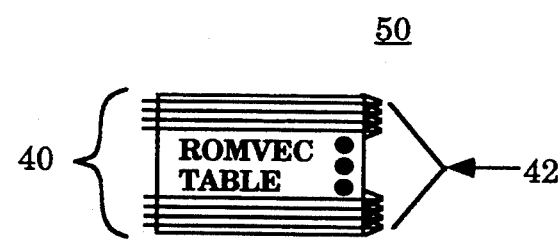
Figure 1E:
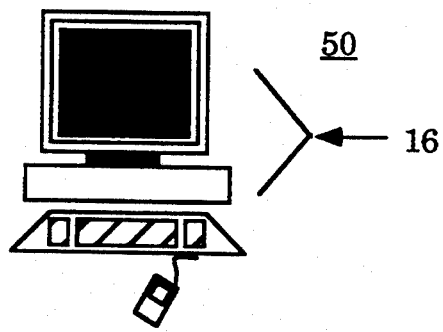

The detailed description which follows is presented largely in terms of algorithms and symbolic representations of operations on data bits and data structures within the computer memory. These algorithmic description representations are means used by those skilled in the data processing arts to most effectively convey the substance of their works to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signal capable of being stored, transferred, combined, compared, and otherwise manipulated. It proves convenient at times, principally for reasons of common usage, to refer to these signals as bits, bytes, address space, symbols and numbers, or the like. It should be borne in mind, however, that all of these and similar terms are to be associated with the appropriate physical quantities and are merely convenient labels applied to these quantities.

Furthermore, the manipulations performed are often referred to in terms such as adding or comparing or translating, which are commonly associated with the mental operations performed by a human operator. No such capability of a human operator is necessary, or desirable in those cases, and in any of the operations described herein which form part of the present invention; the operations are machine operations. Useful machines for performing the operations of the present invention include general purpose digital computers or other similar devices. In all cases, it should be borne in mind that the distinction between the method of operations in operating a computer and the methods of computation itself. The present invention relates to method steps for operating a computer in processing electrical or other (for example, mechanical or chemical) physical signals to generate other desired physical signals.

The present invention also relates to apparatus for performing these operations. The apparatus may be specially constructed for required purposes, or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

The following detailed description will be divided into several sections. The first of these will describe the various devices referenced by a host computer system during a power on sequence. Next, a prior art Power On sequence, including a Power on Self Test (POST), with no OBP PROM device in the host system is compared with a standard power on sequence with an OBP PROM device in the host system. An operating system using a system driver where no OBP PROM device in the host system is also compared to that of an operating system using a system driver where a video OBP PROM device is installed in the host system. Finally, three new support routines to be used in the CPU PROM are disclosed for reducing the duplication of diagnostic code, for standardizing the testing methods and for streamlining the diagnostic functions of the POST sequence.

FIG. 1 is a description of the various devices referenced during a typical power on sequence of the preferred embodiment of the present invention. The power on sequence refers to the sequence of steps a CPU PROM performs to initialize and verify the integrity of essential hardware components necessary for a host computer to operate correctly when power is first applied. A CPU PROM 10 is shown located on the CPU board (not shown) including a CPU (not shown) of a host computer system 50. It should be understood by one skilled in the art that the various devices referenced during the power on sequence are located in memory locations in various hardware components of the host computer system 50. During a normal Power On sequence the CPU resets and initializes the registers in the host computer system using reset initialization and POST codes located in memory location 12 of the CPU PROM 10. The CPU also probes the computer system to determine the type of peripheral devices installed and reports any hardware failures by using the CPU PROM monitor codes located in memory location 14 of the CPU PROM 10. The CPU then retrieves software drivers, located in memory location 16 of the CPU PROM 10, necessary to interact with the peripheral devices. The device drivers located in memory location 16 also control the peripheral devices and allow the host computer and its users to access and exploit the functionality of the peripheral devices. Finally, if no serious hardware failure is diagnosed, the boot code located also at memory location 16 of the CPU PROM permits the CPU to load the primary operating system software.

An option board protocol (OBP) PROM 20 is shown located on each option board device to be interlaced with the CPU PROM 10. The OBP PROM 20 comprises pointers and offsets located in memory location 22 and a plurality of OBP self-test and initialization codes located at memory location 24 of the option board device. The structure and contents of the OBP PROM 20 will be described fully below. In the preferred embodiment of the present invention a one-time modification of the CPU PROM 10 and a one-time installation of the OBP PROM on each peripheral device are sufficient to interface a new option peripheral device with a CPU PROM without retrofitting the CPU PROM. This is in contrast with the prevalent practice of updating the CPU PROM whenever new option boards are introduced.

In FIG. 1, an interrupt handler vector table (IVT) 30 is illustrated as located in a contiguous array in the main memory of a host computer system. The IVT 30 comprises software pointers located at a memory location 32 of the main memory for pointing to individual routines which handle interrupts for the host computer system. A PROM driver vector table (ROMVEC) 40 is shown located in another contiguous array in the main memory location of a host computer system. The ROMVEC table 40 comprises software pointers located at memory location 42 of the main memory for pointing to driver routines which activate each sub-system (i.e., keyboard, video, serial port, disk, floppy and ethernet, etc.). While the IVT 30 permits the host computer to interrupt the execution of the operating system, the ROMVEC table 40 provides the translation mechanism whereby the host computer system accesses the CPU PROM based functions. Finally, a host computer system 50 is shown running the booted operating system following the execution of a successful power on sequence.

As will be described in greater detail below, the CPU accesses the CPU PROM based functions via the ROMVEC Table 40 during the power on sequence. Similarly, upon the loading of the operating system following the power on sequence, the operating system also utilizes some of the same CPU PROM based functions. The present invention provides an option board protocol (OBP) PROM 20 which replaces the pointers in the ROMVEC Table 40 when interfacing with the CPU PROM 10. By redirecting the pointer in the ROMVEC Table 40, the present invention circumvents the normal response of the CPU PROM and thus allows an otherwise unknown board to be recognized and used. The OBP permits the option board to access the CPU PROM based functions during the POST sequence. Thus, the option board may test itself, initialize itself, and load its own driver using the CPU PROM based function when necessary.

Figure 2:
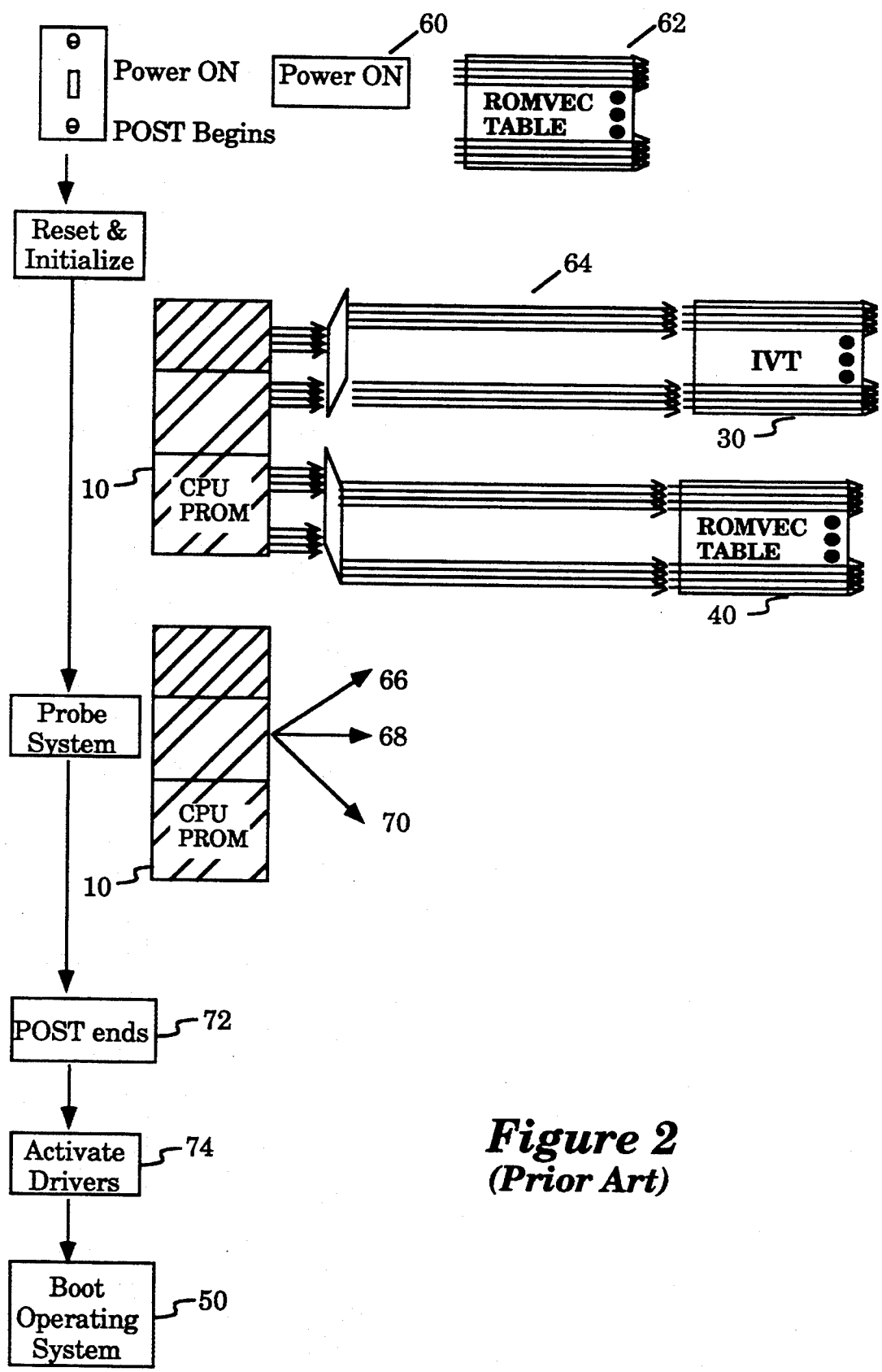
FIG. 2 illustrates a standard Power On Sequence with no option board in the system.

FIG. 2 illustrates a prior art Power On Sequence with no OBP PROM device in the host computer system. In sequence 60, the CPU board is powered on. In sequence 62, the initial state of the ROMVEC Table 40 is such that the pointers therein are inactive. In sequence 64, a reset and initialization code is activated to reset and initialize the hardware components of the computer system. Among other things, the CPU PROM 10 installs the default pointers of the IVT 30 and the ROMVEC Table 40. As such, the CPU PROM 10 connects pointers in the IVT 30 and the ROMVEC Table 40 to its own built-in drivers. Next, the CPU PROM 10 probes the system for the size and type of memory as in sequence 66, probes the system for known plug-in boards as in sequence 68, and probes the system for OBP boards as in sequence 70. It should be understood by one skilled in the art that the description of the sequence of CPU PROM functionalities is not exclusive nor does it necessarily occur in the order as illustrated in FIG. 2. In sequence 72, the testing and initialization of the system is completed. In sequence 74, the CPU PROM activates the CPU PROM based drivers for use by the operating system. Finally, the CPU PROM activates the boot code to boot the operating system.

Figure 3:
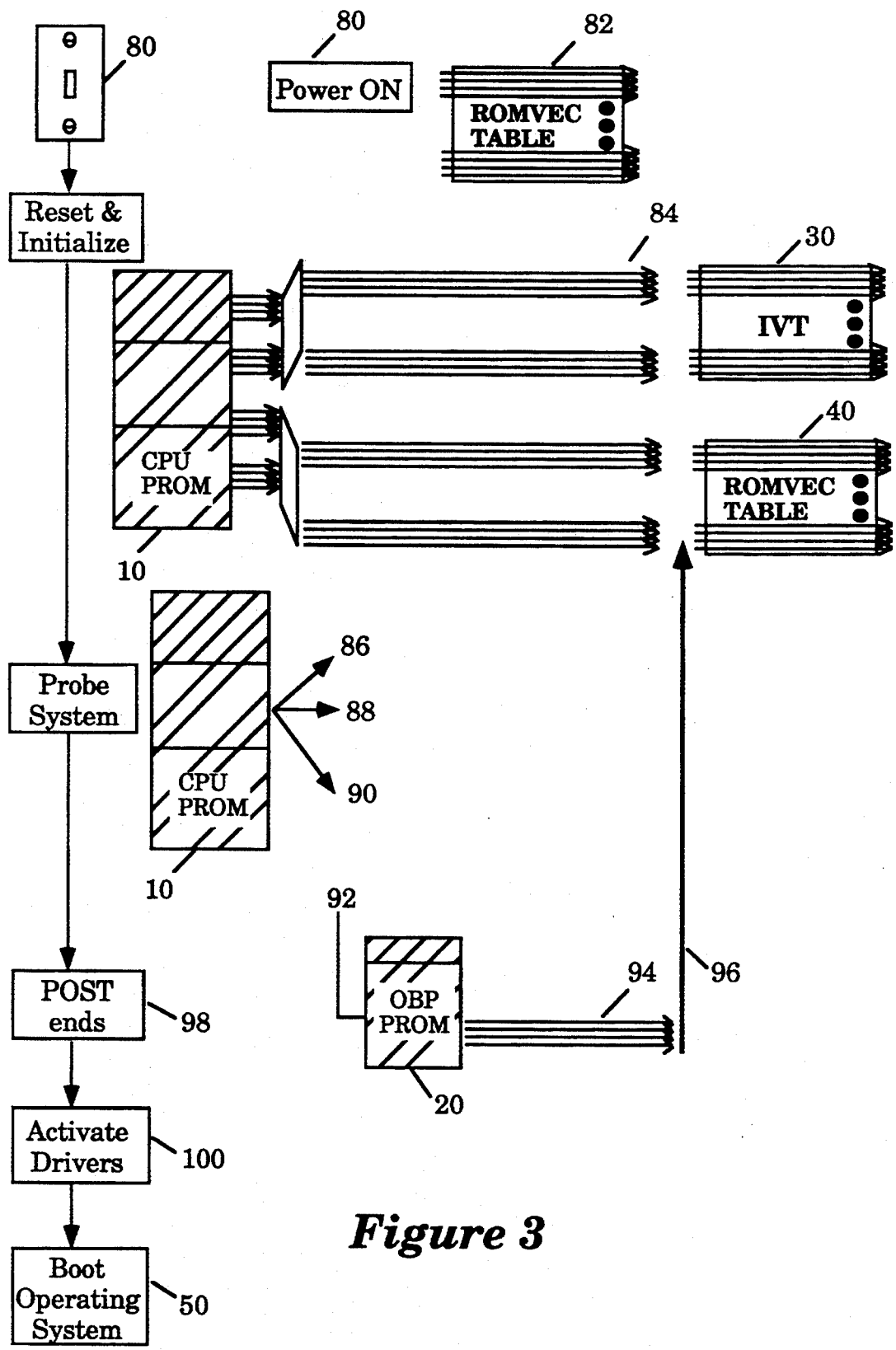
FIG. 3 illustrates a standard Power On Sequence with an option board protocol (OBP) programmable read only memory (PROM) device used in the preferred embodiment of the present invention.

FIG. 3 describes a standard Power On Sequence with an option board protocol (OBP) PROM device used in the preferred embodiment of the present invention. In sequence 80, the CPU board is powered on. In sequence 82, the initial state of the ROMVEC Table 40 is such as the pointers therein are inactive. In sequence 84, the CPU PROM 10 activates a reset and initialization code to reset and initialize all built-in hardware of the system. Among other things, the CPU PROM 10 installs the default pointers of the IVT Table 30 and the ROMVEC Table 40. As such, the CPU PROM 10 connects pointers in the IVT 30 and ROMVEC Table 40 to its own built-in drivers. Next, the CPU PROM probes the system for the size and type of memory as in sequence 86, probes the system for known plug-in board as in sequence 88, and probes the system for OBP boards as in sequence 90. Up to sequence 90, the sequences in FIG. 3 are identical to that in FIG. 2. However, sequence 90 does not proceed to sequence 98 because of the presence of an OBP PROM 20 on the option board. In the prior art, the CPU PROM 10 does not recognize such boards. In the preferred embodiment of the present invention, the CPU PROM 10 activates the OBP PROM 20 code as shown in sequence 92. Under this new sequence, the OBP PROM 20 overrides default pointers in the IVT and the ROMVEC Tables and instead loads new pointers to the corresponding routines in the OBP PROM. Thereafter, the option board test itself according to self test code contained in OBP PROM 20 as shown in sequence 94 and installs OBP drivers as in sequence 96. In sequence 98, the testing and initialization of the system is completed. It follows that in sequence 100, the CPU PROM 10 activates the CPU PROM based drivers for use by the operating system. Finally, the CPU PROM 10 activates the boot code to boot the operating system.

Figure 4A:
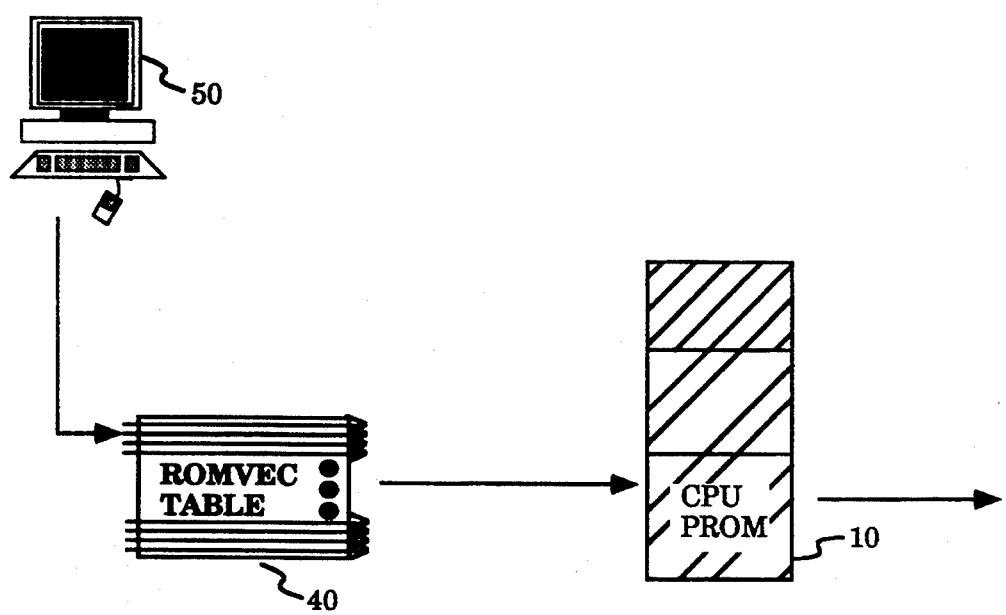
FIG. 4A illustrates an operating system using a ROMVEC Table where there is no OBP PROM device in the host computer system.

FIG. 4A describes an operating system using the ROMVEC Table where there is no OBP PROM 20 or option board in the host computer system. In FIG. 4A, the system call sequence proceeds from the operating system to the ROMVEC Table, then to the CPU PROM 10. The prior art Power On Self Test sequence described in FIG. 4A presupposes a configuration of standard peripheral devices. It should be understood by one skilled in the art that standard peripheral devices refer to peripheral devices that are compatible with the CPU PROM 10 of the computer system. Should the manufacturer or a third party decide to interface a new peripheral device, such as an option board, to the computer system, the CPU PROM 10 would have to be retrofitted. Retrofitting the CPU PROM 10 is a tedious task which involves substantial labor and software overhead. In order to alleviate the laborious task of retrofitting the CPU PROM 10, the present invention encourages the interfacing of new peripheral devices to the computer system by introducing the option board protocol (OBP) PROM device and replacing the pointers in the ROMVEC Table 40.

Figure 4B:
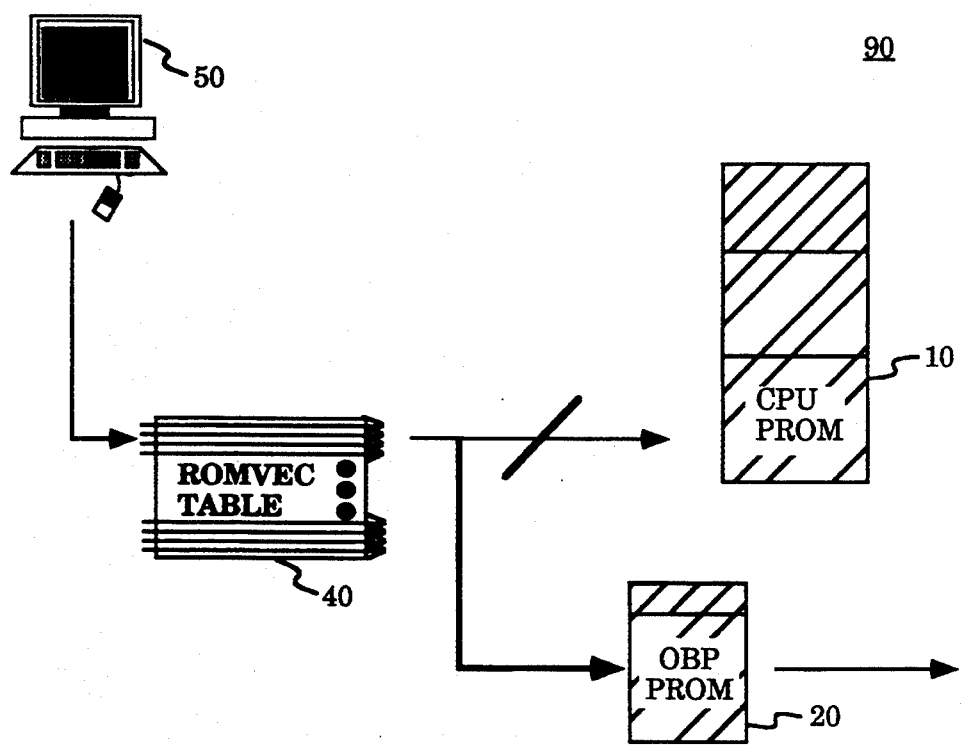
FIG. 4B illustrates an operating system using the ROMVEC Table where there is an OBP PROM device in the host computer.

FIG. 4B illustrates an operating system using the ROMVEC Table 40 when an OBP PROM 20 for a video device is to interface with the CPU PROM 10. Shown there, the system call sequence proceeds from the operating system generating a system call to access the driver for the video device through the same ROMVEC Table 40 as shown in FIG. 4A. However, instead of triggering the driver routines and code as stored by CPU PROM 10, the pointer installed in ROMVEC Table 40 according to OBP PROM 20 will cause the CPU to execute a sequence of code loading a driver specific to the option board pointed to by ROMVEC Table 40. Note that CPU PROM 10 is entirely bypassed, when OBP PROM 20 code is executed to load the option board driver.

In identifying an option board as described in sequence 90, the CPU PROM in FIGS. 3 and 4B looks for an identification which characterizes that option board. To facilitate the identification by the CPU PROM, it is preferable for each OBP PROM 20 to adopt a structure and contents as outlined by the option PROM header 22 as illustrated in FIG. 5. Entry 108 of the option PROM header 22 contains a device identification number. Entry 108 is located in the first byte of the option PROM header 22. The remaining entries of the option PROM header 22 assist the CPU PROM 10 in determining the characteristics of each option board and how to interact with it.

The OBP header 22 is part of the option PROM PROM 20 residing on each option board as illustrated in FIG. 1. When the CPU PROM 10 identifies an option board in sequence 90 of FIG. 3, the CPU PROM 10 activates the OBP PROM 20 of the identified option board. The OBP PROM 20 is responsible for providing the firmware support needed by the system. In the preferred embodiment of the present invention, the firmware support or resource is provided through the ROMVEC Table 40, wherein ROMVEC Table 40 is resident at a virtual memory location, or address. The operating system normally maps the virtual memory location of the ROMVEC Table 40 directly into the physical address of the CPU PROM 10. When an option board is identified, the CPU PROM 10 copies the IVT 30 and ROMVEC Table 40 onto a protected memory location of the main memory of the system. At the same time, the protected memory location of the main memory is remapped to point to the virtual address corresponding to ROMVEC Table 40. As such, the individual ROMVEC Table pointers to routines in the CPU PROM can be replaced with new pointers to the OBP PROM and OBP driver code therein. The advantages of replacing pointers in the ROMVEC Table 40 during the Power On Sequence are that the process can be accomplished transparently to the user and that the system automatically configures itself.

Figure 6:
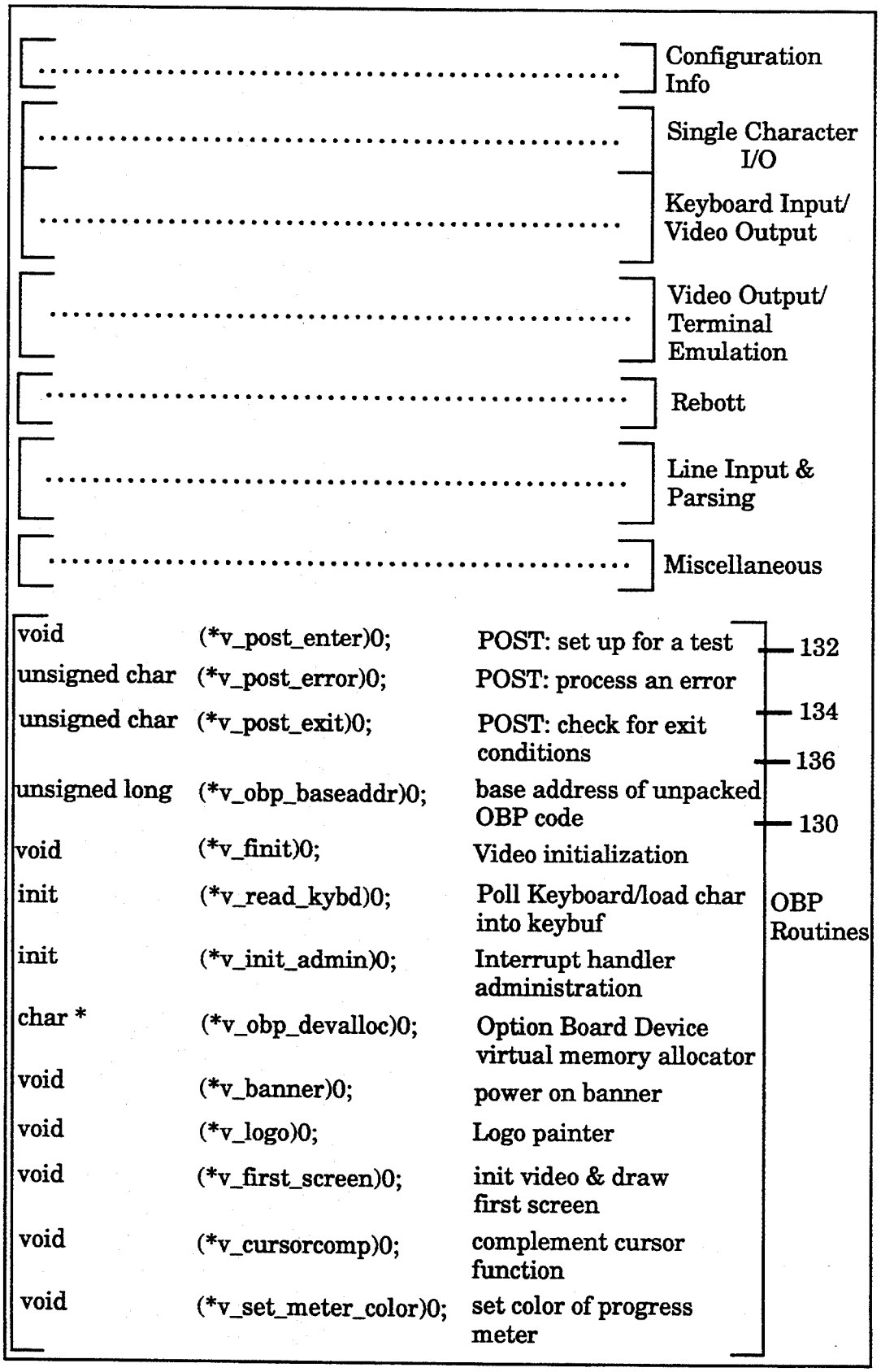
FIG. 6 illustrates the structure of the ROMVEC Table used in the preferred embodiment of the present invention.

As shown in FIG. 5, in the preferred embodiment of the present invention, the virtual address required to replace a ROMVEC Table entry is preferably constructed by code contained in OBP PROM 20. This is accomplished by adding the relative offset of a function in the OBP PROM 20 to the base address where the code, which is specific to the option board having the OBP PROM 20, begins. The base address in turn depends on the run mode of the option board, wherein the run mode is identified by entry 114 in option PROM header 22. In the present preferred embodiment, the OBP PROM has two run modes: (1) under the first mode (Mode 1) the CPU PROM executes the OBP code directly, (2) under the second mode (Mode 0) the CPU PROM unpacks the OBP code into the main memory and the OBP code is accessed from the new location in the main memory. Under the first mode, the CPU PROM maps the OBP PROM itself to an allocated virtual address. Under the second mode, the CPU PROM maps the location of the unpacked code in the main memory to the allocated virtual address. In either mode, the allocated virtual address is then stored in location 130 of the ROMVEC Table 40, as shown in FIG. 6. Thus the process of replacing a ROMVEC pointer is accomplished when the CPU adds the relative offset in the OBP PROM 20 of the desired routine to the allocated virtual address stored in location 130 of the ROMVEC Table 40. This result is then stored in the appropriate ROMVEC Table pointer location, thus completing the replacement process.

With reference to sequence 94 in FIG. 3, the OBP PROM 20 proceeds to install the OBP Self Test and Initialization code according to entries 120 and 128 of option PROM header 22 to test the option board. The installation of the Self Test and initialization (diagnostic) code is automatic because entry 120 of the option PROM header 22 in FIG. 5 provides the proper offset pointing to the OBP PROM address for the diagnostic code. This code will run during the Power On sequence and will be responsible for all power on testing and initialization of the option board hardware in sequence 94 and 96. Although at this point the option board PROM 20 is supplying the CPU with executable option board test and installation code, OBP PROM 20 is able to call on the CPU PROM functions to assist in running the diagnostics. Thus, the option board tests itself, initializes itself, and loads its own driver using the functions or resources available from the CPU PROM. After an option board is activated, the PROM 20 OBP returns to the Power On sequence in sequence 98 and proceeds to load the operating system in sequence 100.

Although the presence of OBP PROM 20 offers designers and manufacturers of option boards flexibility in interfacing with the CPU PROM, the need to emulate the diagnostic functions available from the CPU PROM tends to contribute towards the duplication of code for each device during the power on sequence. As a result, the overhead for testing the power on sequence is burdensome as additional hardware components are installed. As such, the present invention provides three POST functions in the CPU PROM to reduce the duplication of test code and to streamline the diagnostic function of the power on sequence.

In FIG. 6, the ROMVEC Table 40 points to three POST support routines in the CPU PROM 10: POST-ENTER 132, POST-ERROR 134, and POST-EXIT 136. The CPU PROM 10 provides these three functions to facilitate the execution of any given test required by any given OBP PROM 20. For any additional test to be added, one needs only to worry about how to test its hardware subset, not how to fit into the POST sequence.

Figure 7:
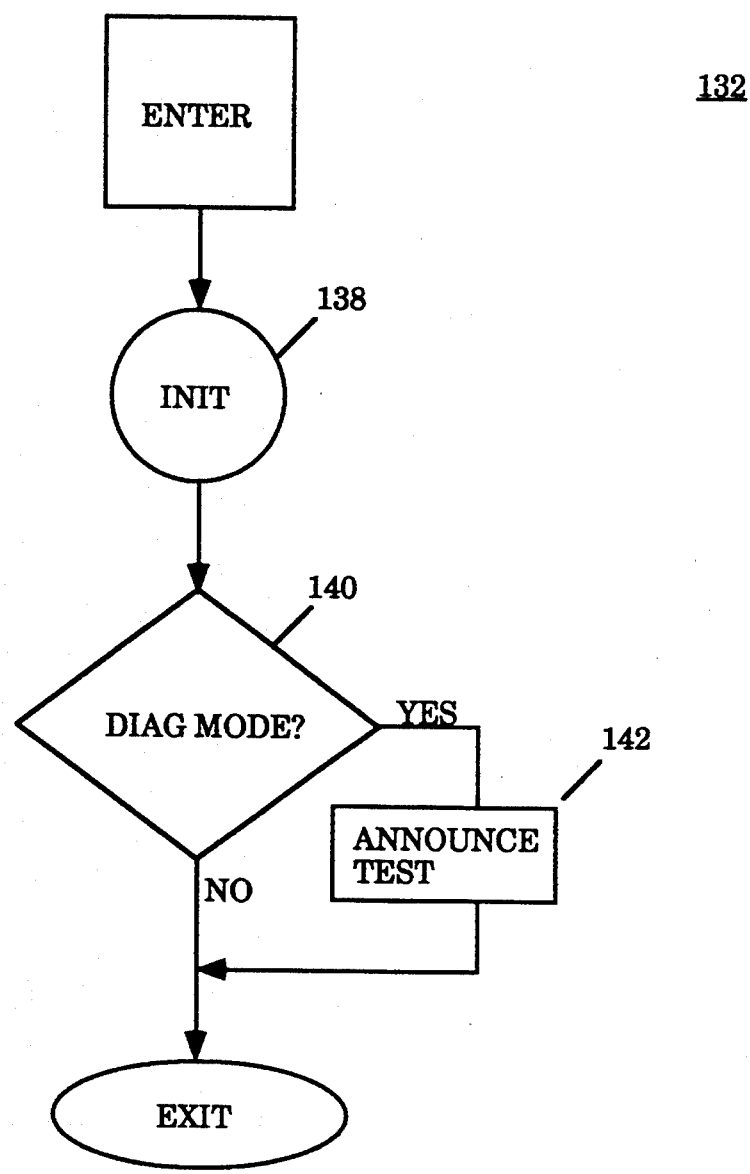
FIG. 7 is a flow chart illustrating the power on self test (POST)-ENTER support routine used in the preferred embodiment of the present invention.

FIG. 7 is a flow chart of the POST-ENTER routine. POST-ENTER 132 initializes the testing parameters such as shared variables and system resources in step 138. In step 140, POST-ENTER determines whether the Power On sequence is in a diagnostic mode. If yes, POST-ENTER announces which test is being run by either outputting the result to an LED or printing the test name to a serial port. If no, POST-ENTER exits.

Figure 8:
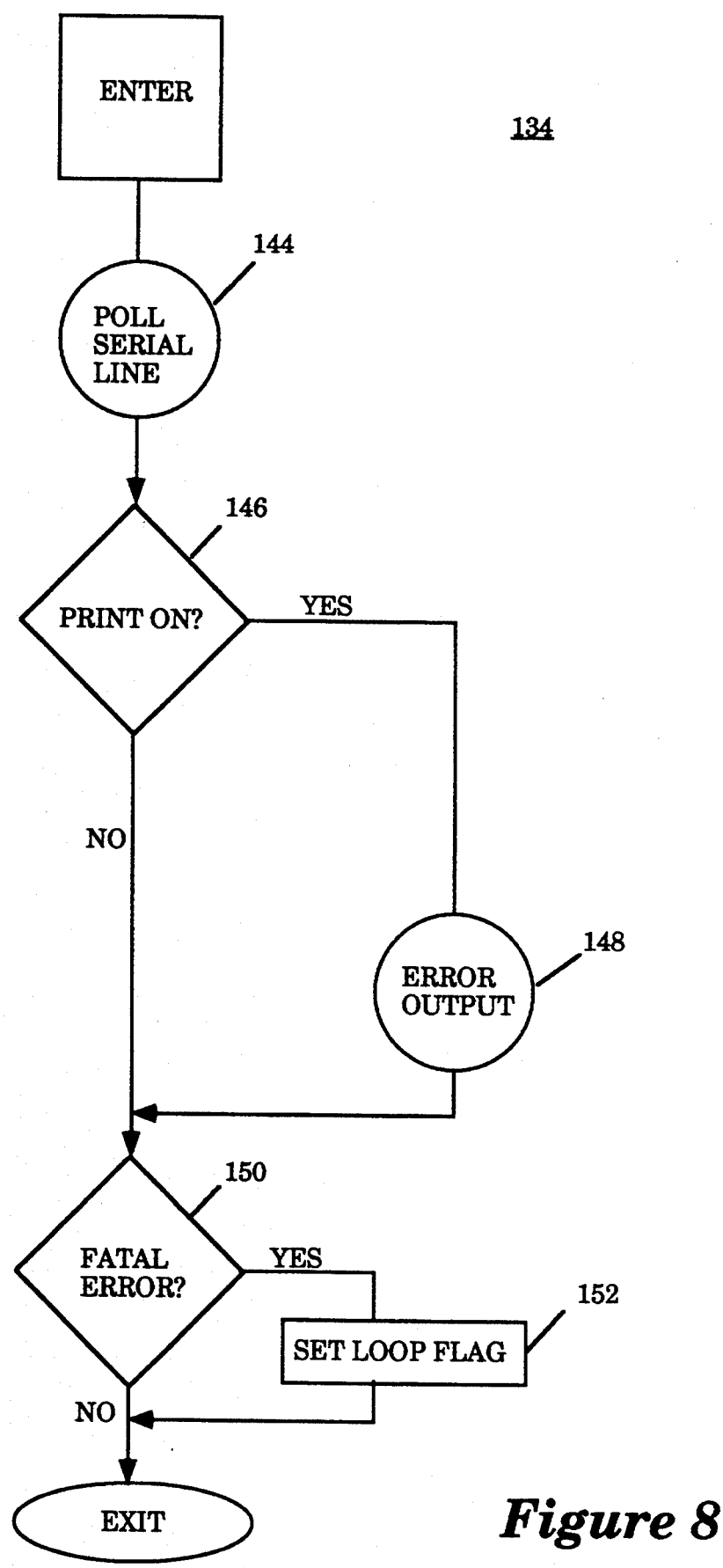
FIG. 8 is a flow chart illustrating the POST-ERROR support routine used in the preferred embodiment of the present invention.

FIG. 8 is a flow chart of the POST-ERROR routine. POST-ERROR 134 is activated when an error condition is detected during the Power On sequence. In step 144, POST-ERROR checks for keyboard input. Next, in step 146, POST-ERROR determines whether the printing function is activated. If yes, it prints out error messages based on either normal or diagnostic mode protocols. If no, POST-ERROR proceeds to determine if the error is fatal in step 150. If it is, POST-ERROR sets loop flag in step 152. Otherwise, it exits from the routine.

Figure 9:
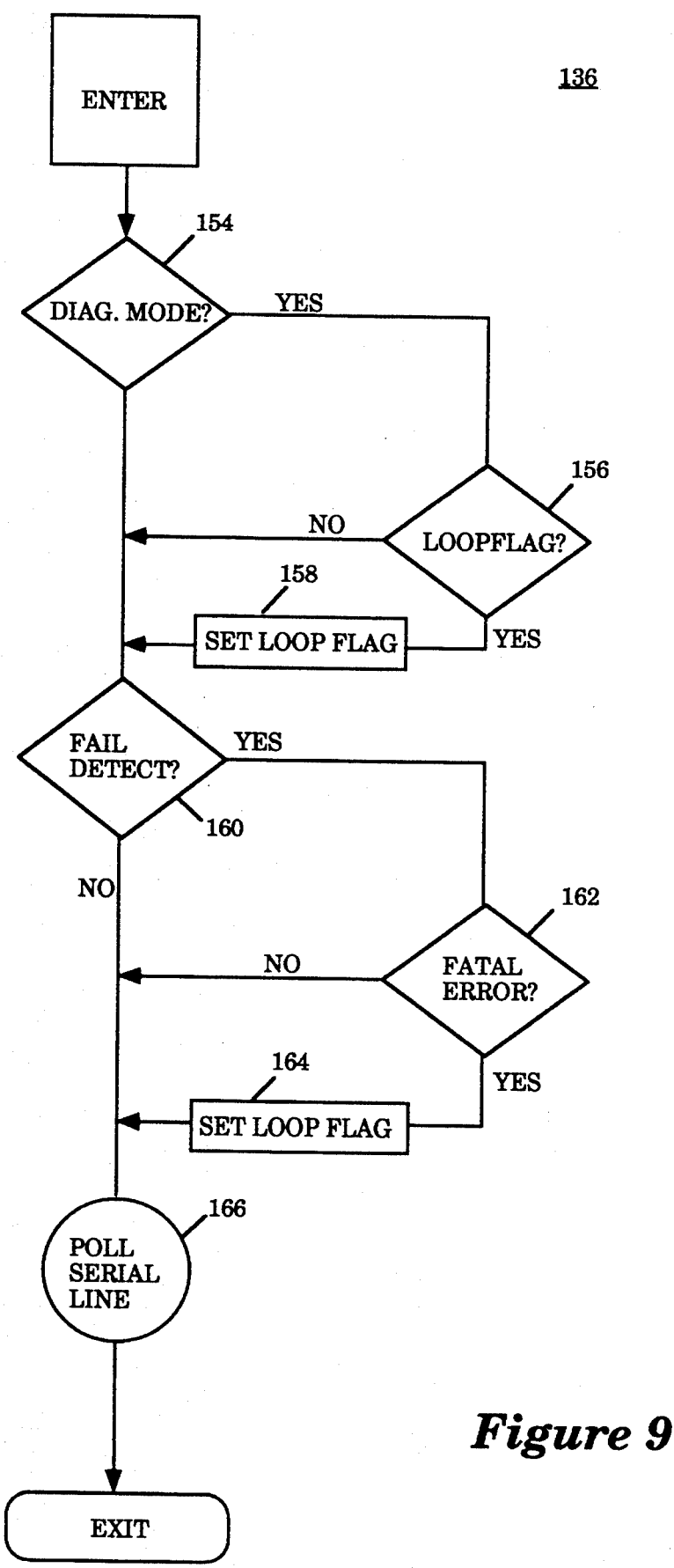
FIG. 9 is a flow chart illustrating the POST-EXIT support routine used in the preferred embodiment of the present invention.

FIG. 9 is a flow chart of the POST-EXIT routine. POST-EXIT 136 maintains a POST loop on test feature and also monitors for fatal errors which may have accidentally escaped from the POST-ERROR routine. POST-EXIT also handles the exit from each separate diagnostic test. Thus, in step 154, POST-EXIT determines whether the Power On sequence is in the diagnostic mode. If yes, it tests further to see if the test has been pre-set to loop in step 156. If yes, POST-EXIT sets loop flag. Otherwise, it proceeds to determine if the test failed before exiting in step 160. If yes, POST-EXIT finds out in step 162 if the error is fatal. If yes, it sets the loop flag in step 164. Otherwise, POST-EXIT checks for keyboard input in step 166.

The above three POST functions of the CPU BOOT PROM together comprise a support layer of minimal self test functionality for the power on sequence. Because the POST functions are accessible by every hardware component and operating system of the computer system, there is less need for independent diagnostic code. Furthermore, because the arguments of the POST functions are pre-defined, there is a uniformity in the displayed error messages. Finally, because POST functions are accessible, especially in the diagnostic mode, repair and maintenance personnel can interact with the diagnostic in a uniform manner.

Although the present invention has been described with reference to FIGS. 1-9, it will be understood that the figures are for illustration only and should not be taken as limitations upon the invention. It is contemplated that many varied embodiments and applications incorporating the teachings of the present invention may be easily construed by those skilled in the art.

I claim:

1. In a computer system having a central processor unit (CPU), a main memory, and a CPU programmable read-only memory (PROM) storing a plurality of CPU PROM functions accessible by said CPU and an operating system during and after a power on sequence, a method for overriding said CPU PROM functions during a power on sequence when a multiplicity of option boards having an option board protocol (OBP) PROM's storing a plurality of OBP PROM functions and an option board identification number are installed in said computer system, said method comprising the steps of:

building a first vector table comprising entries within said main memory, said first vector table identified by a first virtual address range;

providing a first plurality of pointers to said CPU PROM functions by storing, in said entries of said first vector table, physical addresses corresponding to said CPU PROM functions stored in said CPU PROM;

mapping, through said operating system, said first vector table to said CPU, such that said CPU PROM functions are accessible to said CPU by accessing said first virtual address range;

reading said option board identification numbers so as to identify said option boards to said CPU when said option board is installed in said computer system;

copying said first vector table to a protected portion of said memory so as to generate a second vector table when said board identification numbers are identified to said CPU;

providing a second virtual address range to identify said second vector table;

providing a second plurality of pointers to said first virtual address range by storing, in said entries of said second vector table, addresses corresponding to said first virtual address range;

providing a third plurality of pointers to said OBP PROM functions by storing, in said entries of said second vector table, base addresses corresponding to said OBP PROMs for said option boards such that said OBP PROM function identified by said third plurality of pointers overrides said second plurality of pointers to said first virtual address range to identify said CPU PROM functions; and re-mapping through said operating system, said second vector table to said CPU such that said CPU may access addresses within said second virtual address range to obtain an address in said first virtual address range to access said CPU PROM functions and said third plurality of pointers to access said OBP PROM functions.

2. The method according to claim 1, wherein providing said third plurality of pointers to the OBP PROM functions further comprises the steps of:

adding a plurality of address offsets to said base addresses corresponding to said OBP PROMs to form OBP PROM function addresses and, storing said OBP PROM function addresses in said entries of said first vector table;

whereby said OBP PROM functions are accessible to said CPU during said power on sequence.

3. The method according to claim 2, wherein said OBP PROM function addresses pointing to said OBP PROM functions stored in selected virtual addresses of said first virtual address range in said first vector table override any of said CPU PROM functions having pointers previously stored within said selected virtual addresses of said first vector table when said option boards are present.

4. The method according to claim 3, wherein said power on sequence comprises the step of accessing certain CPU PROM functions and OBP PROM functions during a power on self test (POST) routine during said power on sequence to provide said power on self test to said OBP boards.

5. The method according to claim 4, wherein said pointers stored in said vector table point to said CPU PROM functions and to said OBP PROM functions for all installed option boards.

6. The method according to claim 5, wherein said OBP PROMs comprise at least an option PROM header comprising an option board identification number.

7. The method according to claim 6, wherein said option PROM header further comprises:
a PROM size identifier;
a PROM address for operating system code and option board drivers;
operating system code and driver code size identifiers;
an OBP PROM address for diagnostic code;
a diagnostic code size identifier;
at lease one run mode identifier;
and,
option board protocol code.

8. The method defined in claim 7, wherein said plurality of CPU PROM functions resets and initializes hardware components of said computer system, said hardware components comprising said option board.

9. The method defined in claim 8, wherein said plurality of CPU PROM functions tests the integrity of hardware components of said computer system, said hardware components comprising said option board.

10. The method defined in claim 9, wherein said plurality of CPU PROM functions installs drivers for said hardware components of said computer system, said hardware components comprising said option board.

11. In a computer system having a central processing unit (CPU), a main memory, and a CPU programmable read-only memory (PROM) storing a plurality of CPU PROM functions accessible by said CPU and an operating system during and after a power on sequence, an initialization override system for overriding said CPU PROM functions during a power-on sequence when a multiplicity of option boards having option board protocol (OBP) PROMs storing a plurality of OBP PROM functions and an option board identification number are installed in said computer system, said initialization override system comprising:
a first vector table stored in said main memory, said first vector table identified by a first virtual address range and comprising a plurality of entries;
a first plurality of pointers stored in said entries of said first vector table, said first plurality of pointers identifying said CPU PROM functions and comprising physical addresses corresponding to said CPU PROM functions stored in said CPU PROM;
mapping means coupled to said second vector table and said CPU for mapping said first vector table to said CPU, such that said CPU PROM functions are accessible to said CPU by accessing said first virtual address range;
reading means coupled to said CPU for reading said option board identification numbers so as to identify said option boards to said CPU when said option board is installed in said computer system;
copy means coupled to said memory for copying said first vector table to a protected portion of said memory so as to generate a second vector table when said board identification numbers are identified to said CPU;
a second virtual address range to identify said second vector table;
a second plurality of pointers to said first virtual address range by storing, in said entries of said second vector table, addresses corresponding to said first virtual address range;
a third plurality of pointers stored in said entries of said second vector table, said third plurality of pointers pointing to said OBP PROM functions and comprising base addresses corresponding to said OBP PROMs for said option boards installed such that said OBP PROM function identified by said third plurality of pointers overrides said second plurality of pointers to said first virtual address range to identify said CPU PROM functions; and
re-mapping means coupled to said second vector table and said CPU for re-mapping through said operating system, sad second vector table to said CPU such that said CPU may access addresses within said second virtual address range to obtain an address in said first virtual address range to access said CPU PROM functions and said third plurality of pointers to access said OBP PROM functions.

12. The initialization override system according to claim 11, wherein said third plurality of pointers further comprises:
a plurality of address offsets added to said base addresses of said OBP PROMs to form OBP PROM function addresses,
said first vector table storing said offset OBP PROM function addresses.

13. The initialization override system according to claim 12, wherein said OBP PROM function addresses pointing to said OBP PROM functions stored in selected virtual addresses of said first virtual address range in said first vector table override any of said CPU PROM functions having pointers previously stored within said selected virtual addresses of said first vector table said option boards are present.

14. The initialization override system according to claim 13, wherein said CPU accesses certain CPU PROM functions and OBP PROM functions during a power on self test (POST) routine during said power on sequence to provide said power on self test to said OBP boards.

15. The self-configuring option board system according to claim 14, wherein said pointers stored in said vector table point to said CPU PROM functions and to said OBP PROM functions for all installed option boards.

16. The self-configuring option board system according to claim 15, wherein said OBP PROMS comprise at least an option PROM header comprising an option board identification number.

17. The initialization override system according to claim 16, wherein said option PROM header further comprises:
a PROM size identifier;
a PROM address for operating system code and option board drivers;
operating system code and driver code size identifiers;
an OBP PROM address for diagnostic code;
a diagnostic code size identifier;
at lease one run mode identifier;
and,
option board protocol code.

18. The initialization override system according to claim 17 wherein said plurality of CPU PROM functions resets and initializes hardware components of said computer system, said hardware components comprising said option board.

19. The initialization override system according to claim 18 wherein said plurality of CPU PROM functions tests the integrity of hardware components of said computer system, said hardware components comprising said option board.

20. The initialization override system according to claim 19 wherein said plurality of CPU PROM functions installs drivers for said hardware components of said computer system.

* * * * *